United States Patent
Plant et al.

(10) Patent No.: US 11,250,219 B2
(45) Date of Patent: Feb. 15, 2022

(54) COGNITIVE NATURAL LANGUAGE GENERATION WITH STYLE MODEL

(71) Applicant: INTERNATIONAL BUSINESS MACHINES CORPORATION, Armonk, NY (US)

(72) Inventors: Laurence Plant, North Balwyn (AU); Stefan Harrer, Hampton (AU); Sean Rory Costello, Leichhardt (AU); James David Cleaver, Grose Wold (AU)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 213 days.

(21) Appl. No.: 16/409,014

(22) Filed: May 10, 2019

(65) Prior Publication Data

US 2019/0311039 A1    Oct. 10, 2019

Related U.S. Application Data

(63) Continuation-in-part of application No. 15/945,479, filed on Apr. 4, 2018, now abandoned.

(51) Int. Cl.
  *G06F 40/56*    (2020.01)
  *G06F 40/30*    (2020.01)
  *G06F 40/242*   (2020.01)
  *G06F 40/289*   (2020.01)

(52) U.S. Cl.
  CPC ............ *G06F 40/56* (2020.01); *G06F 40/242* (2020.01); *G06F 40/289* (2020.01); *G06F 40/30* (2020.01)

(58) Field of Classification Search
  CPC ........ G06N 20/00; G06N 5/022; G06F 40/30; G06F 40/205; G06F 40/284; G06F 40/242; G06F 40/253; G06F 40/20; G06F 40/279; G06F 40/289; G06F 40/56; G06F 40/40; G06F 16/30; G06Q 30/0276; G06K 9/00442
  See application file for complete search history.

(56) References Cited

U.S. PATENT DOCUMENTS

| | | | |
|---|---|---|---|
| 8,856,004 | B2 | 10/2014 | Basson et al. |
| 10,083,157 | B2* | 9/2018 | Strope ................ G06F 16/35 |
| 2013/0144605 | A1* | 6/2013 | Brager ................ G06F 40/40 |
| | | | 704/9 |
| 2017/0132208 | A1 | 5/2017 | Adavelli et al. |
| 2017/0185583 | A1* | 6/2017 | Pino ................ G06N 7/005 |

(Continued)

OTHER PUBLICATIONS

Clement et al., Ngram and Bayesian Classification of Documents for Topic and Authorship, Literary and Linguistic Computing, vol. 18, Issue 4, Nov. 2003, pp. 423-447, https://doi.org/10.1093/llc/18.4.423 (Year: 2003).*

(Continued)

*Primary Examiner* — Michelle M Koeth
(74) *Attorney, Agent, or Firm* — Aaron Pontikos; George S. Blasiak; Heslin Rothenberg Farley & Mesiti PC

(57) ABSTRACT

Methods, computer program products, and systems are presented. The methods include, for instance: obtaining a style feed including a plurality of original works by an author. An author-style model for the author is built based on the style feed by use of a selected neural network, and a publication is generated in the style of the author based on the author-style model.

19 Claims, 7 Drawing Sheets

(56) References Cited

U.S. PATENT DOCUMENTS

2017/0185590 A1 6/2017 Tetreault et al.
2018/0107645 A1* 4/2018 Payne ................ G06F 16/9536

OTHER PUBLICATIONS

Stamatatos et al., "Automatic Text Categorization in Terms of Genre and Author," 2001, Association for Computational Linguistics, pp. 471-495. (Year: 2001).*

Daza et al., "Automatic Text Generation by Learning from Literary Structures," Proceedings of the Fifth Workshop on Computational Linguistics for Literature, NAACL-HLT 2016, pp. 9-19, San Diego California, Jun. 1, 2016 (Year: 2016).*

Petrenz et al., "Stable Classification of Text Genres. Computational Linguistics," 2011, 37. 385-393. 10.1162/COLI_a_00052 (Year: 2011).*

Clement et al., Ngram and Bayesian Classification of Documents for Topic and Authorship, Literary and Linguistic Computing, vol. 18, Issue 4, Nov. 2003, pp. 423-447, https://doi.org/10.1093/llc/18.4.423 (Year: 2003).*

Kabbara et al., "Stylistic transfer in natural language generation systems using recurrent neural networks," Proceedings of the Workshop on Uphill Battles in Language Processing: Scaling Early Achievements to Robust Methods, 2016 (Year: 2016).*

I Bozkurt, et al. *"Authorship Attribution: Performance of Various Features and Classification Methods."* Computer and Information Sciences, 2007, $22^{nd}$ International Symposium.

P. Mell, et al. *"The NIST Definition of Cloud Computing"*, NIST Special Publication 800-145, Sep. 2011, Gaithersburg, MD.

J. Rygl *"Automatic Adaptation of Author's Stylometric Features to Document Types"* Springer International Publishing Switzerland, TSD 2014, LNAI 8655, pp. 53-61, 2014.

L. Plant, et al., "Cognitive Natural Language Generation with Style Emulation," U.S. Appl. No. 15/945,479, filed Apr. 4, 2018.

List of IBM Patent and/or Patent Applications treated as related for U.S. Appl. No. 16/409,014, filed May 10, 2019, dated May 10, 2019.

* cited by examiner

COGNITIVE NATURAL LANGUAGE GENERATION WITH STYLE MODEL

TECHNICAL FIELD

The present disclosure relates to cognitive machine learning technology, and more particularly to methods, computer program products, and systems for style modeling and a stylized natural language generation.

BACKGROUND

Existing natural language generation (NLG) applications mostly focus on generating data-driven materials such as financial/business reports, weather forecast, and sports journalism, which generally have predetermined formats and various values. For certain types of publications, audiences recognize characteristics and style of the publications by associating with a certain entity/author, and often prefer the publications with a particular authorship. Considering the numerous ways of communication with the modern communication technologies, as well as how frequently new publication is requested for such communication channels, a demand to publish on respective channels would be too high to be met by any human authors and too costly for publishing entities.

SUMMARY

The shortcomings of the prior art are overcome, and additional advantages are provided, through the provision, in one aspect, of a method. The method for automatically generating a publication in a style of an author includes, for instance: obtaining, by one or more processor, a style feed including a plurality of original works by the author; building, by the one or more processor, an author-style model for the author based on the style feed, by use of a selected neural network; and generating, by use of natural language generation, the publication in the style of the author based on the author-style model from the building.

Additional features are realized through the techniques set forth herein. Other embodiments and aspects, including but not limited to computer program products and systems, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
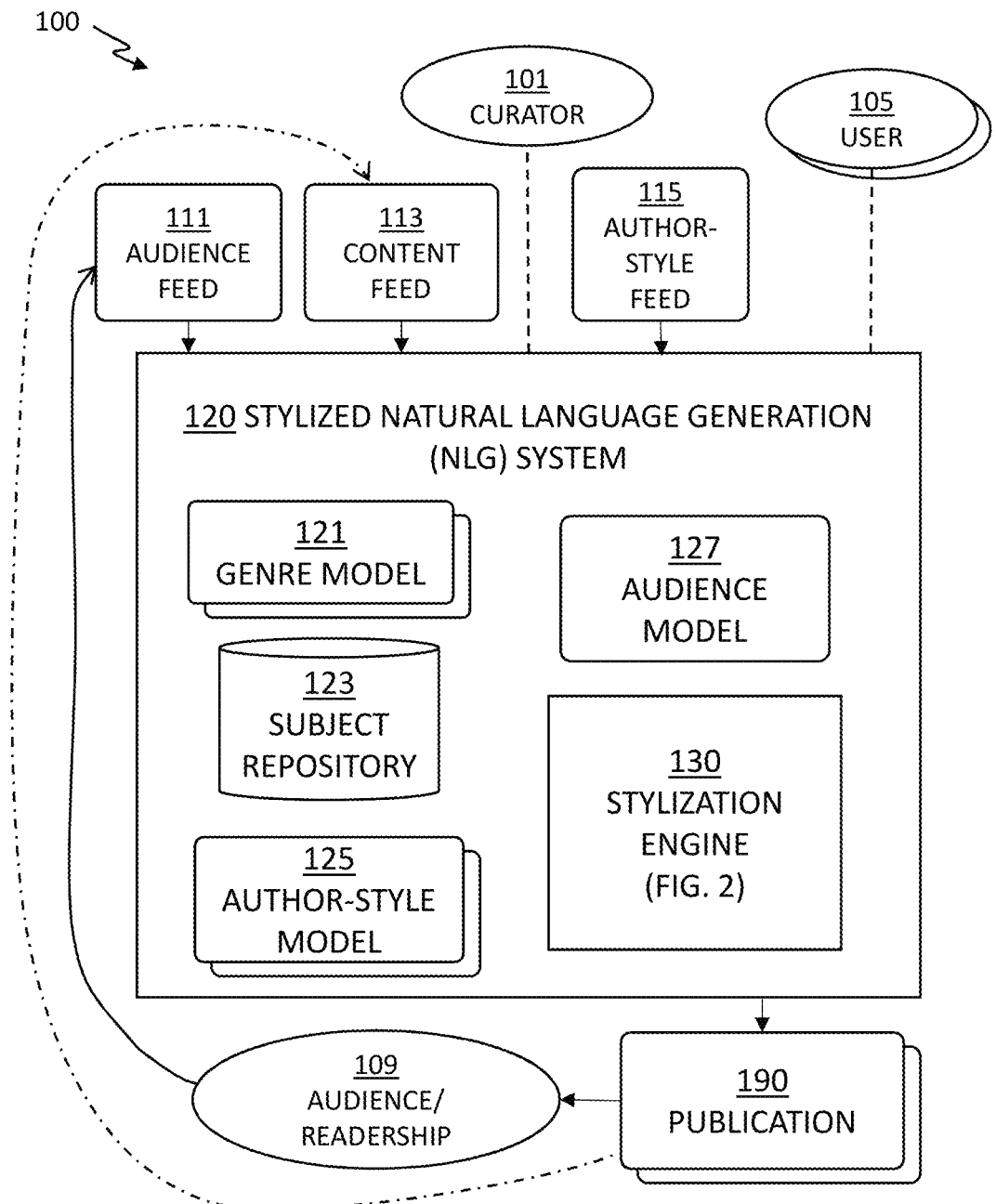
FIG. 1 depicts a system for natural language generation in a style of a preconfigured author, in accordance with one or more embodiments set forth herein.

FIG. 1 depicts a system 100 for natural language generation in a style of a preconfigured author, in accordance with one or more embodiments set forth herein.

Embodiments herein recognizes that current media communication environment demands instantaneous publications of various kinds as the source material evolves. Often, major news organizations treat social media postings by public figures regarding a certain newsworthy event as relevant news, and utilizes social media poll as a tool in surveying audience responses. As the instantaneity, or extreme promptness, of publications are the essence in competition amongst these news organizations, the pressure to generate publications in a timely manner is great. On the other hand, to generate such vast amount of moment-to-moment publications, the cost per publication has to be kept to minimum. Accordingly, because having a skilled human author to write a lot of publications in a speedy manner is implausible for any organization because of the timeframe and/or cost, the need for automated publication by use of computational linguistics (CL), natural language processing (NLP), and natural language generation (NLG) is great.

The embodiments herein also recognizes that conventional NLG applications mostly focus on generating data-driven materials such as quarterly business reports, monthly sales performance reports, weather forecasts, and sports journalism. Accordingly, the publications generated by NLG are primarily data presentation in a form of literature, and because audiences do not expect such data intensive material to be stylistic, such publications are well received. The embodiments herein also recognizes that, in other kinds of publications in business/corporate context, however, audiences may not receive the publications by NLG as well as publications authored by human writers, particularly when the audiences seek and consume the publications by a particular entity because of idiosyncratic styles of respective entities.

The embodiments herein also recognizes that, in certain circumstances where a particular audience response is expected from a publication, as in a media campaign, commercial or social, existing material which had been proven to have a similar audience response can be useful as examples. Accordingly, such existing materials and corresponding audience responses are to be used as training data to further the effectiveness of media campaigns in which automatically generated publications are utilized.

The system 100 includes a natural language generation (NLG) system modeling a stylized authorship, or simply, a stylized NLG system 120. The stylized NLG system 120 learns a certain style with automated modeling and machine learning by use of artificial neural network(s) from source materials and generates desired publication in the learned style.

The stylized NLG system 120 includes one or more genre model 121, a subject repository 123, one or more author-style model 125, an audience model 127, and a stylization engine 130. The stylized NLG system 120 takes inputs from an audience feed 111, a content feed 113, and an author-style feed 115, and generates outputs of one or more form of publication 190.

The stylized NLG system 120 communicates with a curator 101, one or more user 105, and audience/readership 190. The curator 101 controls and manages aspects of training and modeling that affect outputs of the stylized NLG system 120. The user 105 can be one of the authors who are being modeled by the stylized NLG system 120. The user 105 would have been responsible for writing up the publication 190 that is being generated by the stylized NLG system 120. The user 105 can identify, by use of a publication request to the stylization engine 130, a topic/subject matter and a genre of the publication 190, target content of the publication 190, target audience of the publication 190, a channel by which the publication 190 is communicated. The user 105 also can review and edit the publication 190 and modify after the publication 190 has been presented to the audience 109, in order to keep track of new developments dealt in the publication 190. In certain embodiments of the present invention, the publication 190 is associate with a confidence score, which indicates how similar the generated publication 190 is to the original style of the author being modeled, as represented in the author-style feed 115. The confidence score of the publication 190 can be used to determine a level of how well the neural network for the stylized NLG system 120 has been trained. The curator 101 can configure a threshold for the confidence score to a level of verisimilitude in style of the publication 190, according to various aspects, including but not limited to, demographic and perception level, of target audiences, and/or the purpose of the publication 190.

The audience/readership 190 is a consumer of the generated publication 190, who can provide the audience feed 111 to the stylized NLG system 120 with respect to perception of the publication 190, particularly on the style of the publication 190 as of an author, or the user 105. The audience feed 11 includes demographic information of respective audience groups, such that the audience model 127 can identify a style particularly effective for a certain target audience subgroup. Perceived verisimilitude in the style of the publication 190 to a known style by the author, or the user 105, can be quantified as a style score in the audience feed 111, in order to optimize the author-style model 125, the audience model 127, and/or corresponding operations of the stylization engine 130. It is presumed that the author whose style is being modeled had agreed with the generation and distribution of the publication 190, pursuant to the operations of the stylized NLG system 120, and that the stylized NLG system 120 operates only within legal bounds with respect to any intellectual property rights involved in materials taken from the audience feed 111, the content feed 113, and the style feed 115, as well as the generated publication 190.

The stylization engine 130 of the stylized NLG system 120 operates by use of selected forms of artificial neural network for deep learning such as deep feedforward (DFF) neural networks, deep belief networks (DBN), deep convolutional network (DCN), and recurrent neural networks (RNN). Such artificial neural network can be a custom-programmed component of the stylization engine 130, or a tool available for subscription, that is external to the stylized NLG system 120. Accordingly, the inputs of the audience feed 111, the content feed 113, and the author-style feed 115 would train the stylized NLG system 120 by use of the selected artificial neural network(s) and result in the models including the genre model 121, the author-style model 125, the audience model 127, and the subject repository 123.

The stylization engine 130, by use of the selected artificial neural network, generates the publication 190 from the genre model 121, the author-style model 125, the audience model 127, and the subject repository 123. Distinctive artificial neural networks can be utilized for respective modeling and generating the publication. Detailed operations of the author-stylization engine 130 are presented in FIG. 2 and corresponding description. The stylization engine 130 can differentiate same publication 190 according to a channel through which the publication 190 would be communicated to the audience/readership 190. Examples of the channel include, but are not limited to, live presentation, web articles, social media postings, online news headlines, interviews, op-eds, press releases, reports, etc.

In certain embodiment of the present invention, the content feed 113 includes various types of material classified by a genre and a subject of each material. Accordingly, the genre model 121 includes various models per genre of the publication 190 as learnt from the content feed 113. Examples of the genre of the publication include, but are not limited to, corporate literature including marketing material, product documentation, whitepapers, corporate news updates, which can benefit from a unique corporate publication style and delivery. Examples of the genre further include, but are not limited to, online updates/threads of news organizations, periodic weather updates, and newsfeed on social media. The audience/readers 109 would recognize the publication 190 as published by a particular entity/author based on the author-style model 125.

In certain embodiment of the present invention, the subject repository 123 includes a plurality of subject models, where each subject model is an aggregated set of information thread for a specific subject, chronologically ordered with identifying themes, actions, and participants to a relevant events. In certain embodiments of the present invention, the subject repository 123 can be organized as a news archive, categorized by conventional news topics, such as politics, business, art and culture, science and technology, world news, local news, weather, sports, etc. The stylized NLG system 120 builds the subject repository 123 based on the content feed 113 inputs. The content feed 113 can be various online and offline publications, multimedia pieces such as movies, documentaries, television shows, news clips, etc. The content feed 113 can be screened for copyrighted material to avoid any unauthorized usage, or have an agreement to use copyrighted material for each source in place beforehand, depending on policies of an entity running/operating the stylized NLG system 120.

In certain embodiment of the present invention, the audience model 125 is a record of interests for respective readers/members of audience, which is built based on the audience feed 111, which includes audience responses, surveys and/or evaluations on the publication 190 as provided by the audience/readership 190, as being categorized by demographic of the audience member, time, location, and format of the publication.

In certain embodiment of the present invention, the author-style feed 115 includes various original works of an author and/or a group of authors that are being modeled by the stylized NLG system 120. The author-style feed 115 can be classified per author, per genre/period, per subject, per channel, or combinations thereof. For example, the same author can have different styles from social network postings to formal presentations, from casual dialogues to public speeches. The stylization engine 130 would process the author-style feed 115 according to a refinement level of the author-style model 125 as configured by the curator 101.

Elements of style as utilized by the stylization engine 130 can include: proficiency levels and/or idiosyncratic usages on basic elements of spelling, grammar, and punctuation; typical diction, indicating choices of words, particularly amongst synonyms and alternative choices, signature word sequences, also referred to as collocation or phraseme, that is rarely used by general public of the subject language, habitual sentence structures, including an average sentence length in the number of words, and recurring paragraph structures, and an average paragraph length in the number of sentences; social dialect corresponding to socio-economic class, age, and/or other demographic features of the author and/or target audience; a linguistic/social register, or simply a register, indicating vocabulary richness and formality scale; fluency/frequent usage in specialized nomenclature of particular topics, areas of industry, and/or academic subjects; and combinations thereof. Stylometry, indicating the statistical analysis of variations in literary style from one author or genre to another, is well developed in effort to identify authors of old literatures. Conventional studies on author attribution suggests variety of categories in style elements, similar to presented above, with several hundreds to a few thousands subcategories for each categories. As noted, the stylization engine 130, by use of the selected artificial neural network(s) and available techniques in cognitive modeling, computational linguistic (CL), would self-categorize and learn patterns of the style of a modeled author in building the author-style model 125.

The stylized NLG system 120 utilizes an approach to train existing neural networks on how to identify features in various input documents. The curator 101 instructs the stylized NLG system 120 to look for elements of style/authorship, and the stylization engine 130 identifies authorial/stylistic patterns from the input documents at a training stage. The authorial/stylistic patterns identified by the selected neural network are modeled and utilized in generating the publication 190 in an operating stage. In the operating stage, the curator 101 assesses the trained patterns according to the relevancy of the identified patterns with the desired authorial/stylistic effect of the publication 190, and patterns irrelevant to the desired authorial/stylistic effect would be discarded. As noted above, detailed operations of the stylization engine 130 are presented in FIG. 2 and corresponding description.

The stylized NLG system 120 can be utilized in order to offer a more consistent and unified style for a group of authors, rather than having a wide range of differentiated styles from one author to another, in generating a series of publications, such as news articles, business reports, technical manuals, and text books. The stylized NLG stem 120 also offers adapting a certain publication to a style more recognizable and appealing to a target audience group by use of the audience modeling based on various socio-linguistic patterns specific to the target audience group, which can lead to a more favorable reception and effective communication of the publication 190 to the audience/readership 109.

Figure 2:
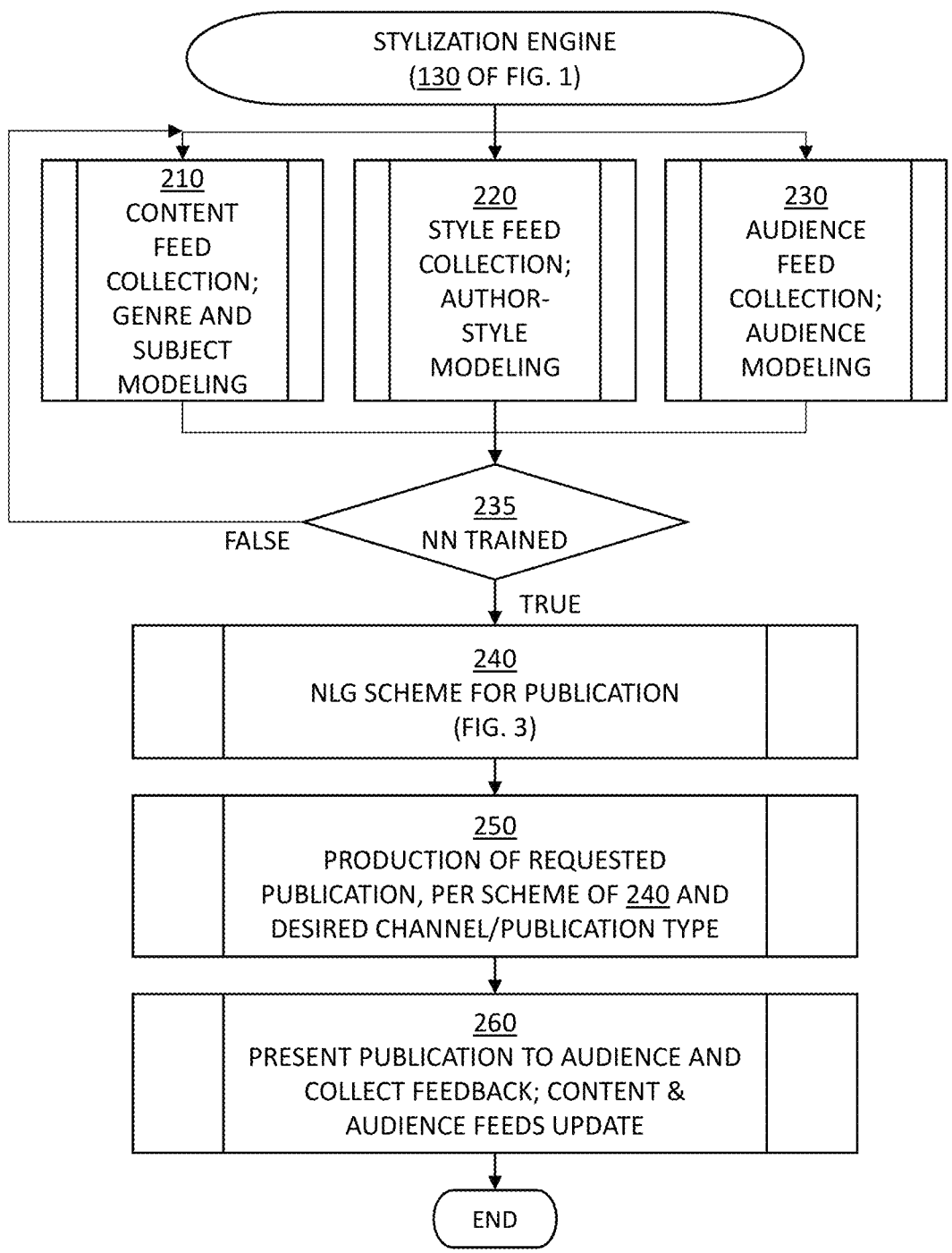
FIG. 2 depicts a flowchart of operations performed by the stylization engine, in accordance with one or more embodiments set forth herein.

FIG. 2 depicts a flowchart of operations performed by the stylization engine 130 of FIG. 1, in accordance with one or more embodiments set forth herein.

Blocks 210, 220, and 230 represent respective initial training and modeling components that can be performed independently from one another. Accordingly, in one embodiment of the present invention, the stylization engine 130 performs blocks 210, 220, and 230 concurrently depending on respective input feeds/training data. In the same embodiment of the present invention, the stylization engine 130 performs blocks 210, 220, and 230 in a sequence best suits the pace of respective input feeds/generation of training data, as the stylization engine 130 takes the publication 190 output and the audience feed 111 as inputs. Blocks 210 through 230 can be grouped as a Training Phase of a neural network for the stylization engine 130. Blocks 240 through 260 can be grouped as an Operation Phase of the stylization engine 130.

In block 210, the stylization engine 130 collects the content feed 113 and builds the genre model 121 and the subject repository 123 accordingly. In certain embodiments of the present invention, the stylization engine 130 utilizes any deep learning neural network architecture, which takes in unstructured data for the content feed 113 and other inputs. The stylization engine 130 can preprocess the content feed 113 with a text analysis/parsing tool or other external natural language processing (NLP) tools, such that the content feed 113 analyzes the content feed 113 for respectively tagged elements typical to the genre model 121, patterns typical to the genre model 121, and the subject repository 123, as configured by the curator 101 by use of control functions inherent to the type of the selected artificial neural network, such as assignment of initial weight for each network object, feed ratio/weight adjustment per triggered conditions, as well as employing differentiated types of artificial neural network that suits best for the required pattern recognition and modeling. Further, the stylization engine 130 can include the publication 190 to the content feed 113 such that the publication 190 as being generated by the stylization engine 130 can also be modeled in the stylized NLG system 120. Then the stylization engine 130 proceeds with block 235.

In block 220, the stylization engine 130 collects the author-style feed 115 and builds the author-style model 125 accordingly. As noted in block 210, the stylization engine 130 can employ another type of artificial neural network for building the author-style model 125, distinctive from the artificial neural networks for the genre model 121 and the subject repository 123, respectively. In certain embodiments of the present invention, the author-style model 125 can include respective style models of an individual author and/or a group of authors. In certain embodiments of the present invention, the author-style model 125 can include periodical and/or geographical style model as in American Southern Gothic, Victorian Era English novella, etc. Elements of styles are numerous in various categories, and the stylization engine 130 would reinforce or repress respective elements and/or categories of the styles according to configuration by the curator 101. Then the stylization engine 130 proceeds with block 235.

In block 230, the stylization engine 130 collects the audience feed 111 and builds the audience model 127 based on the audience feed 111. The audience feed 111 includes audience responses, surveys and/or evaluations on the publication 190 and/or other content materials, with respect to stylistic aspects and perceptions thereupon. In certain embodiments of the present invention, the audience feed 111 is structured in a scale that corresponds to numerical style scores for each level of the scale, such that the response to the publication 190 can be easily quantified and reflected in the audience model 127. Then the stylization engine 130 proceeds with block 235.

In block 235, the stylization engine 130 determines whether or not the neural network of the stylization engine 130 has been trained enough for the Operation Phase, in which the stylization engine 130 practices generating the publication 190. If the stylization engine 130 determines, in block 235, that the neural network is ready for the Operation Phase, then the stylization engine 130 proceeds with block 240. If stylization engine 130 determines that the neural network is not ready, then the stylization engine 130 loops back to blocks 210 through 230 in order to continue with the Training Phase.

In certain embodiments of the present invention, the stylization engine 130 determines if the neural network is ready for the Operation Phase, by generating a test publication and by ascertaining that the test publication has been assessed as having a confidence score greater than a preconfigured threshold for the confidence score, where the preconfigured threshold for the confidence score indicates that the style represented in the test publication would be similar enough for the target audience.

In certain embodiments of the present invention, the stylization engine 130 determines if the neural network is ready for the Operation Phase, by testing the generated models individually, based on respectively preconfigured measures for the subject model, the genre model 121, the author-style model 125, and the audience model 127, and/or according to predefined thresholds for respective models.

In certain embodiments of the present invention, the stylization engine 130 is configured to determine whether or not the neural network is trained enough for the Operation Phase, by setting a predetermined number for respective training data samples per respective models. The predetermined number for the respective training data samples would be in a range large enough to learn patterns for respective models, from a few hundreds to a several thousands, depending on the characteristics of the patterns that are to be operational as a model. For example, the audience model 127 is configured to use one thousand (1,000) samples of the audience feed 111, per age group, where the audience 109 is classified into five (5) age groups such as (0-20, 21-27, 28-35, 36-47, 48 and over) for a channel frequented by users from all age groups.

In certain embodiments of the present invention, the stylization engine 130 is configured to determine whether or not the neural network is trained enough for the Operation Phase, by ascertaining the models based on respective criteria. For example, the audience model 127 is assigned with the highest priority, and would be determined as being trained enough for the Operation Phase if a certain number of samples of the audience feed 111 has been learnt by the audience model 127, to learn usable patterns for each genre, each subject, and each author-style. In the same example, the curator 101 configures the author-style model 125 as having a next highest priority, and would be determined as being trained enough for the Operation Phase if a certain number of samples of the author-style feed 115 has been learnt and the author-style model 115 manifests usable patterns for each genre and each subject, per each audience response patterns.

In block 240, the stylization engine 130 produces a natural language generation scheme for the publication 190 according to a publication request, based on the genre model 121, a corresponding subject model from the subject repository 123, the author-style model 125, and the audience model 127. The user 105 submits the publication request to the stylization engine 130, prior to block 240. An exemplary embodiment for operations of block 240 is presented in FIG. 3 and corresponding description. Then the stylization engine 130 proceeds with block 250.

In block 250, the stylization engine 130 generates the publication 190 according to the NLG scheme determined from block 240. The stylization engine 130 can generate more than one publication 190 by differentiating the publication 190 according to respective channels by which the publication 190 is communicated. Each channel can have distinctive elements specified for publications to include, in addition to linguistic/literary requirements, as in hashtag labels for certain social media network postings. The stylization engine 130 also can calibrate the style of the publication 190 for respective audience groups, based on various demographic features including age, as represented in the audience feed 111. Then the stylization engine 130 proceeds with block 260.

The stylization engine 130 establishes a confidence score indicating how similar the generated publication 190 is to the original style of the author being modeled, as represented in the author-style feed 115. In certain embodiments of the present invention, the stylization engine 130 reports the confidence score to the user 105, such that the user 105 is informed on the extent of similarity of the publication 190 with modeled style, as well as have opportunity to adjust the publication 190 if the confidence score is below a preconfigured acceptable threshold.

In block 260, the stylization engine 130 presents the publication 190 generated from block 250 to the audience/readership 190 and optionally collects feedback from the audience/readership 190 when provided. The stylization engine 130 updates the content feed 113 with the publication 190. When audience response is provided, the stylization engine 130 updates the audience feed 111 with the audience response. Then the stylization engine 130 terminates a processing cycle. The stylization engine 130 can iterate blocks 210 through 260 with the updated audience feed 111 and the updated content feed 113.

The stylization engine 130 can receive, in block 260, a review feedback and/or one or more update request from the user 105. The update request from the user 105 after the publication 190 had been presented to the audience 109 is to follow latest development of an event that had been reported in the publication 190, or a relevant topics that can be added to a thread for the publication 190, depending on the channel in which the publication 190 has been presented. The stylization engine 130, upon receiving the update request from the user 105, directly updates the publication 190 with changes/additions requested by the user 105, without modeling in blocks 210 through 230 and NLG scheming for the publication 190 in block 240.

Figure 3:
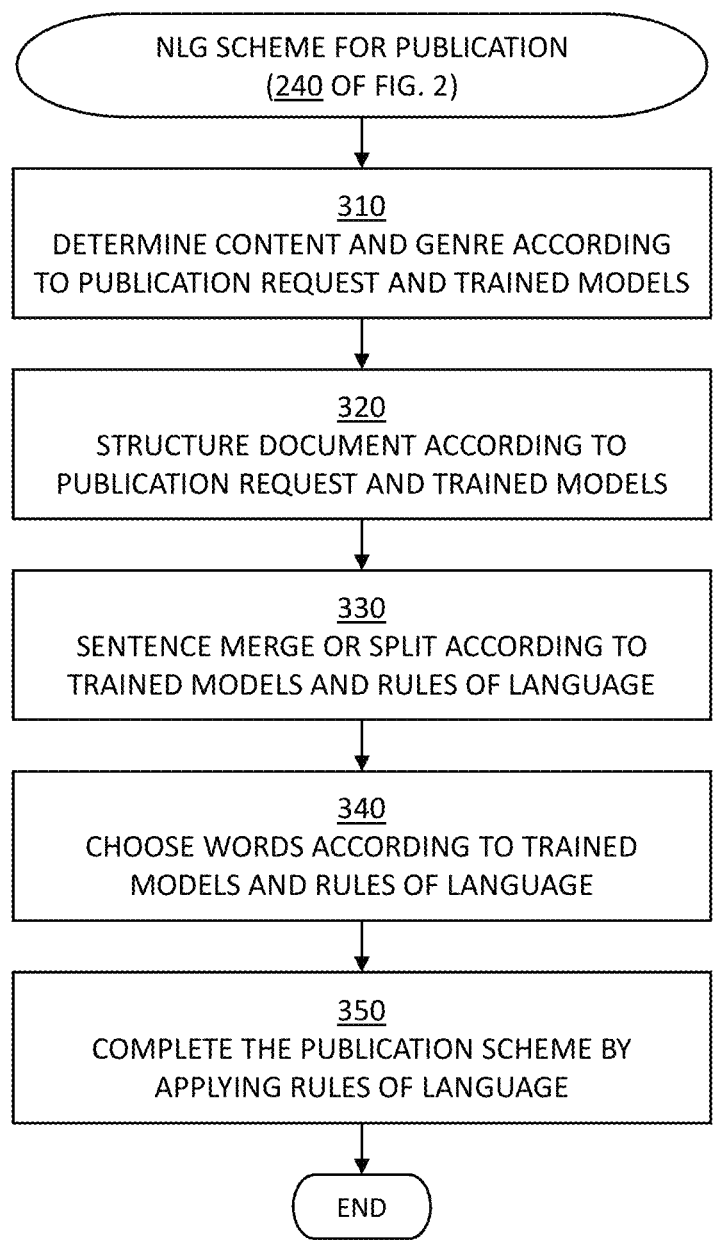
FIG. 3 depicts a flowchart of the natural language generation scheme for the publication as performed in block 240 of the stylization engine, in accordance with one or more embodiments set forth herein.

FIG. 3 depicts a flowchart of the NLG scheme for the publication 190 as performed in block 240 of the stylization engine, in accordance with one or more embodiments set forth herein.

In certain embodiments of the present invention, the stylization engine 130 utilizes typical stages of natural language generation (NLG) scheme in planning for the publication 190, with style-based determinations for each stage of the NLG scheme, where applicable. In planning the natural language generation for the publication 190, the stylization engine 130 can utilize an external NLG tool that is configured with the genre model 121, the subject models from the subject repository 123, the author-style model 125, and the audience model 127, as being trained from blocks 210 through 230.

Prior to block 310, or block 240 of FIG. 2, the stylization engine 130 receives a publication request from the user 105. In certain embodiments of the present invention, the stylization engine 130 can generate the publication request automatically based on preconfigured triggering conditions, such as a search spike for a specific topic, public figure, and/or event, a periodic setting as in daily evening headline news, or a weekly local event calendars. Examples of parameters specified in the publication request include, but are not limited to: (1) a topic/theme for the publication such as business, international, society, culture, health, science and technology; (2) a purpose of the publication such as a media campaign, fundraiser, educational; (3) a target audience as specified by demographic features, locations, and/or an area of interest; (4) a desired length of the publication as in a word count, the number of pages in a certain format; (5) a channel type of the publication such as a social media posting, social network newsfeed, text/mobile message push notification, email, e-books, deliverable periodicals; (6) an expected time of publication such as immediately, by a certain date and time of an event, immediately and update every day; and (7) a preferred author/style for the publication, which also can be set the requesting user 105 as the author whose style should be modeled.

In block 310, the stylization engine 130 determines content of the publication 190 according to the specification from the publication request. The stylization engine 130 examines subject models from the subject repository 123 and takes a closest subject model into account. The stylization engine 130 also check the genre models 121 against the specification of the requested publication 190, and selects a best genre model 121 for the publication 190. Further, the stylization engine 130 can look up the author-style model 125 in order to select a best-fit author for the selected genre model and the selected subject model, if the publication request had designated more than one author-style model 125 as being applicable. Then the stylization engine 130 proceeds with block 320.

In block 320, the stylization engine 130 determines how the topic/motive of the publication 190 would progress from the beginning to the end, and structures paragraphs and/or sentences of the publication 190, according to the subject model 123 and the author-style model 125. If the author habitually uses a certain structure distinctive from other authors even with the same subject model 123, then the stylization engine 130 gives more weight to the author-style model 125 than the subject model 123 in determining the structure of the publication 190. The structure of the publication 190 can vary according to various factors requested for the publication 190 such as the length, the purpose, the target audience, and the channel. Then the stylization engine 130 proceeds with block 330.

In block 330, the stylization engine 130 checks if two or more candidate sentences with similar meanings can be merged into one sentence, or vice versa, according to the author-style model 125 and/or to other readability measures of a subject language. Accordingly, the stylization engine 130 determines how many sentences are to be presented in what order in the publication. In certain embodiments, the stylization engine 130 can utilize the audience model 127 in order to make the sentences in the publication 190 more appealing and readable for the target audience, particularly when the target audience have a distinctive literary characteristics in sociolect. Then the stylization engine 130 proceeds with block 340.

In block 340, the stylization engine 130 selects words consistent with the meanings of respective sentences as determined in block 330, according to the author-style model 125. Rarely used terms and particular word sequences preferred by the author/style designated in the publication request and/or selected author-style model 125, which can be an identifying feature of the author-style being modeled, would be selected with the highest priority. Then the stylization engine 130 proceeds with block 350.

In block 350, the stylization engine 130 can perform certain substitutions on proper names, pronouns and/or anaphora, according to rules of reference applicable to the subject language used for the publication 190. The stylization engine 130 complete the NLG scheme for the publication according to the rules of syntax, morphology, that is, the rule of word forms, orthography, that is, the rule of spelling, and any other rules applicable to the subject language in generating the publication 190. Then the stylization engine 130 proceeds with block 250 of FIG. 2.

Figure 4:
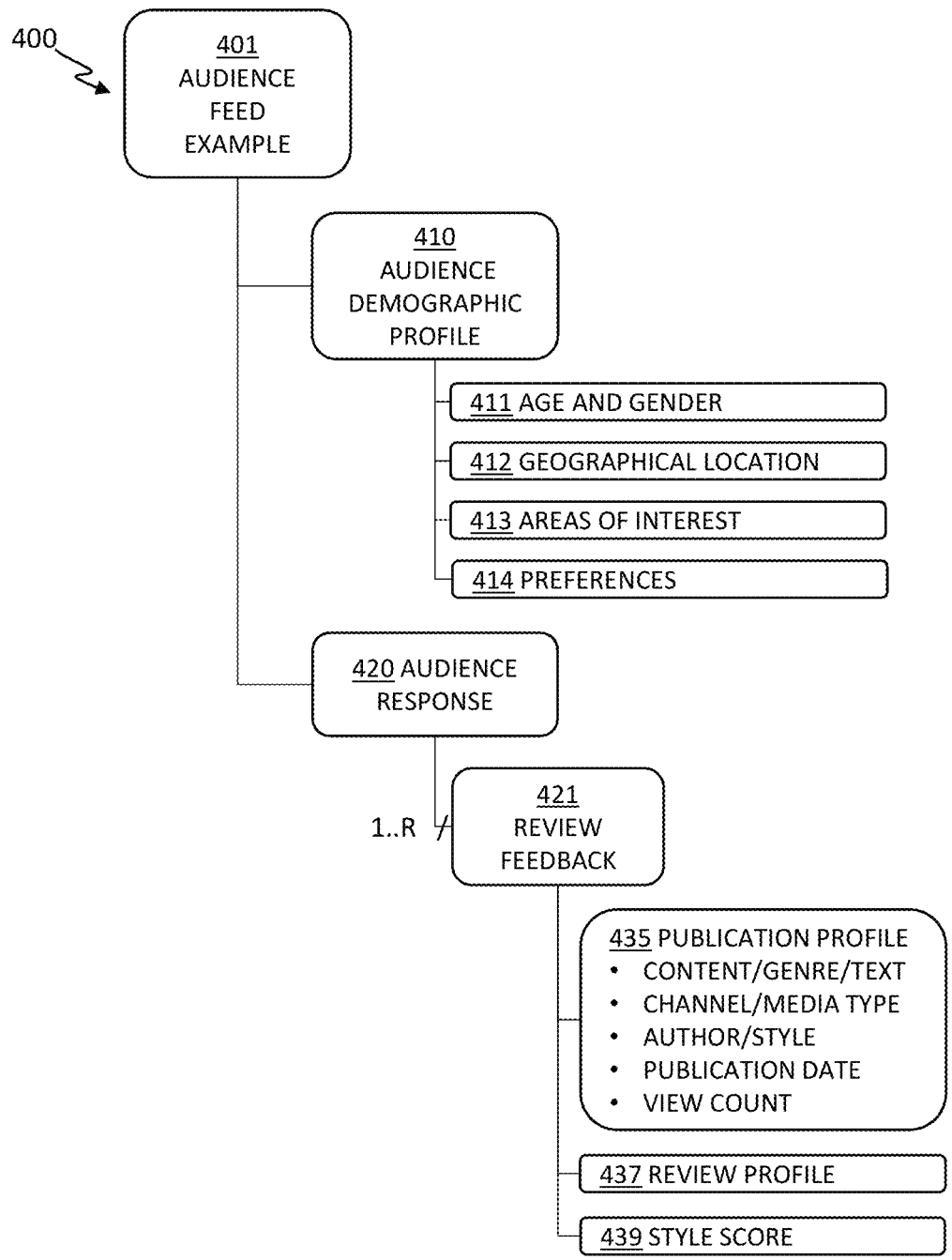
FIG. 4 depicts an exemplary composition of the audience feed, in accordance with one or more embodiments set forth herein.

FIG. 4 depicts an exemplary composition 400 of the audience feed 111 of FIG. 1, in accordance with one or more embodiments set forth herein.

In certain embodiments of the present invention, the audience feed 111 in training data includes an audience feed example 401. Data patterns presented in the audience feed example 401 would be modeled as the audience model 127, by use of the neural network of the stylization engine 130.

Data elements of the audience feed example 401 as shown herein can correspond to respective weights, indicating how significant the respective contribution of each data element is in establishing the audience model 127. The respective weights associated with the data elements presented in the audience feed example 401 can be statically preconfigured by the curator 101. In certain embodiments of the present invention, the respective weights associated with the data elements presented in the audience feed example 401 can be dynamically adjusted by the neural network of the stylization engine 130 according to the training data, but the curator 101 can designate respective ranges within which the respective weights for the data elements can be adjusted. In still other embodiments of the present invention, the weights are not controlled by the curator 101, but the respective weights associated with the data elements presented in the audience feed example 401 are initialized and adjusted only by the neural network of the stylization engine 130 according to the training data. In the same embodiment, the neural network of the stylization engine 130 can be programmed to tune the respective weights to the data elements of the audience feed example 401 based on the data patterns of the training data according to a certain criteria, and/or inherent characteristics of the neural network, where the weight-tuning configuration is encapsulated within the neural network. The curator 101 can select a neural network for the stylization engine 130 such that the training data would be properly modeled according to the purpose of the stylization services.

In the present example, the audience feed example 401 includes an audience demographic profile 410, in order to specify statistical characteristics of the audience 109 to extract response patterns for audience groups. In the same example, the audience demographic profile 410 includes, but are not limited to, an age and gender value 411, a geographical location value 412, an areas of interest value 413, and a preferences value 414.

The values for the audience demographic profile 410 can be selected from a predefined scale by members of the audience 109 in a survey, and/or during gathering the training data for the audience feed 111. The areas of interest value 413 indicate selections from general subjects, such as, a categories of products from a specific type of store website, topics from a news organization, and/or a classification for entities in social network pages. The areas of interest value 413 can be determined based on a particular purpose of the publication 190, such that the audience feed example 401 generated by a member of the audience 109 who had the same areas of interest value 413 as a targeted area of interest for the publication 190 would contribute more to the publication 190 than another audience feed from another member of the audience whose areas of interest are irrelevant to the targeted area of interest for the publication 190. The preferences value 411 can indicate features including, but not limited to, a preferred way of communication, preferred types of media channels/social networks, preferred hangout places, local pastimes, by respective members of the audience 109.

In the present example, the audience feed example 401 includes an audience response 420 corresponding to the audience demographic profile 410. The audience response 420 includes R number of review feedbacks 421 for which the respective members of the audience identified in the audience demographic profile 410 had responded to certain publications, where R is a positive integer large enough to form a statistically meaningful samples, for the members of the audience 109 identified by the audience demographic profile 410, for example, nine hundred (900) per each age group, or one thousand (1,000) per each area of interest.

In the present example, the review feedback 421 includes, but not limited to, a publication profile 435, a review profile 437, and a style score 439. The publication profile 435 identifies which publication had been reviewed by the review feedback 421, and specifies various aspects of the reviewed publication, including, but not limited to: the content, the genre, the text and/or the subscript of the reviewed publication; the channel by which the reviewed publication had been communicated; the media type of the reviewed publication; the author and/or the style of the reviewed publication; the publication date of the reviewed publication; and a view count indicating how many times the reviewed publication had been sought after by the audience 109 in general. The review profile 437 includes, but are not limited to, features of: the date of review; a response value in a predefined scale as in an up or down vote; whether or not any comment has been posted by the member of the audience identified by the audience demographic profile 410; and words/tone/sentiment of any comment posted by the same member.

The style score 439 can be a numerical value within a preset range, or a level in a preconfigured scale, indicating the verisimilitude of the style of the review publication to a known stylistic features of the author/style from the publication profile 435, as perceived by the member of the audience identified by the audience demographic profile 410. For example, a certain Shakespearean publication receives distinctive style scores from respective audience members, and the stylization engine 130 would weigh more a style score provided by a first audience member who is interested in classical English literature than another style score provided by a second audience member who is interested in another area of interest not relevant to appreciation of Shakespearean stylistic features.

As noted, the stylization engine 130, in block 250 of FIG. 2, establishes a confidence score indicating how similar the generated publication 190 is to the original style of the author being modeled, as represented in the author-style feed 115. In certain embodiments of the present invention, the stylization engine 130 can also check the publication 190 against the perceived style score 439 of the audience model 127 in determining the confidence score, such that the confidence score of the publication 190 would reflect perceptions per audience groups as well as objective elements of style.

Certain embodiments of the present invention can offer various technical computing advantages, including the use of neural networks to comprehensively parse and tag unstructured documents and to subsequently train and operate the neural networks for document analysis for automatically generating natural language content in a style of an author and/or a group of authors. An exemplary/desirable style is modeled and a publication is generated by style modeling and stylized natural language generation. The publication so generated can be further evaluated for the level of similarity and can be modified, where applicable. Certain embodiments of the present invention can be further applied to cognitively adapting an existing content to a desired style by the stylization services. Certain embodiments of the present invention, also can adapt the style of the publication to a style most fitting to the content/topic of the publication based on content modeling, and/or to another style that most appealing to a target audience/readership based on audience modeling. Certain embodiments of the present invention can be implemented by use of a cloud platform/data center in various types including a Software-as-a-Service (SaaS), Platform-as-a-Service (PaaS), Database-as-a-Service (DBaaS), and combinations thereof based on types of subscription. The onboarding automation and performance optimization service can be provided for subscribed business entities in need from any location in the world.

Figure 5:
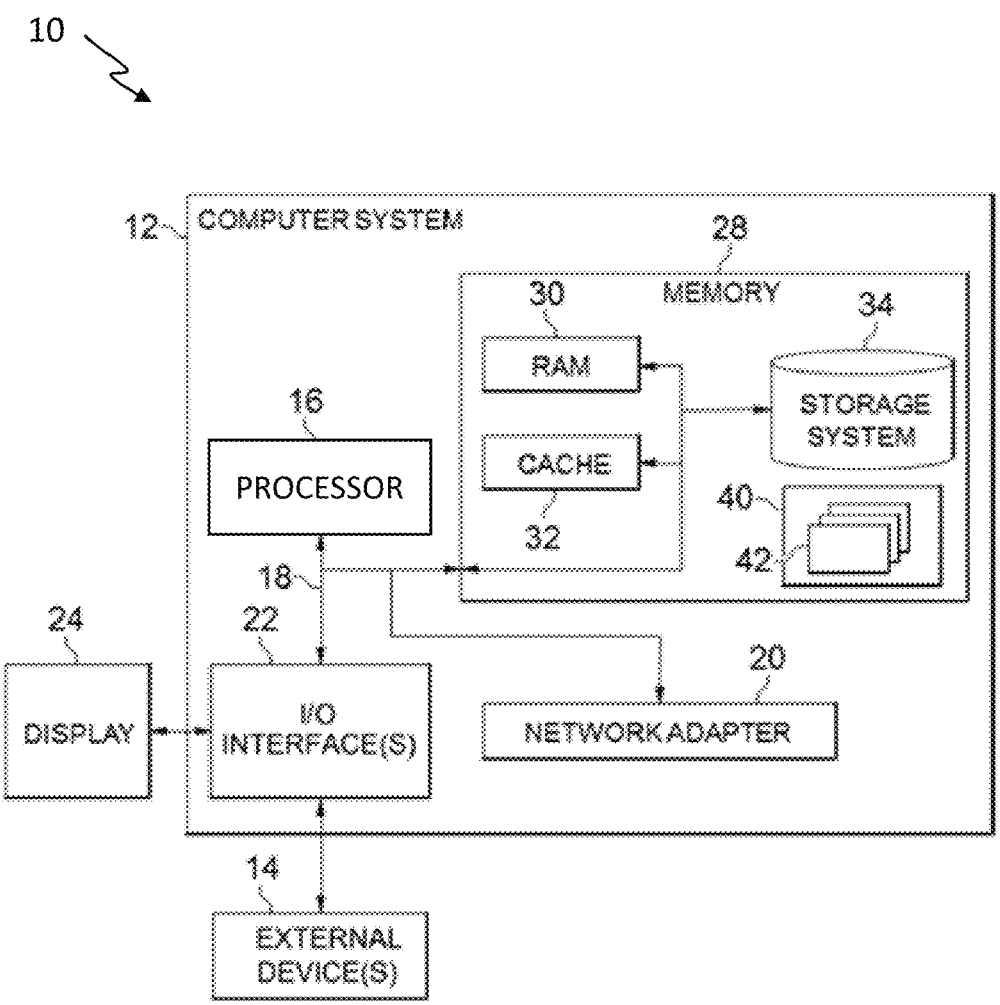
FIG. 5 depicts a cloud computing node according to an embodiment of the present invention.
Figure 6:
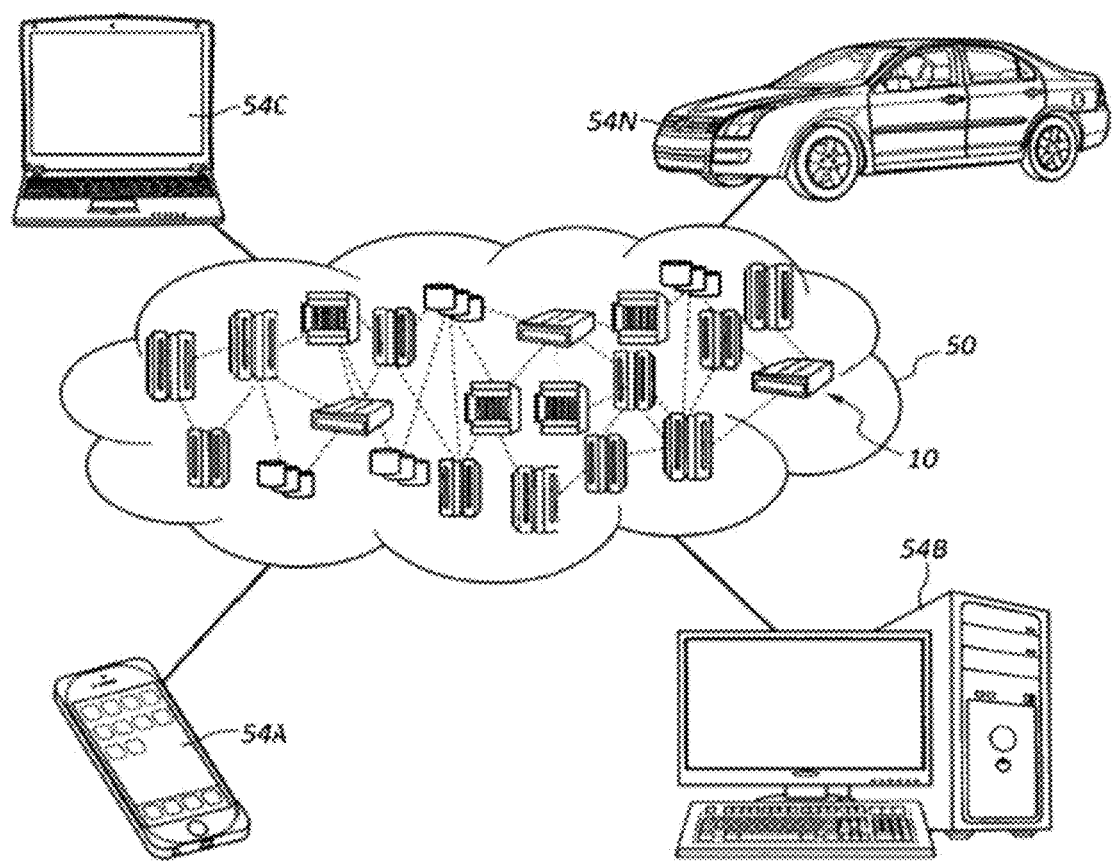
FIG. 6 depicts a cloud computing environment according to an embodiment of the present invention.
Figure 7:
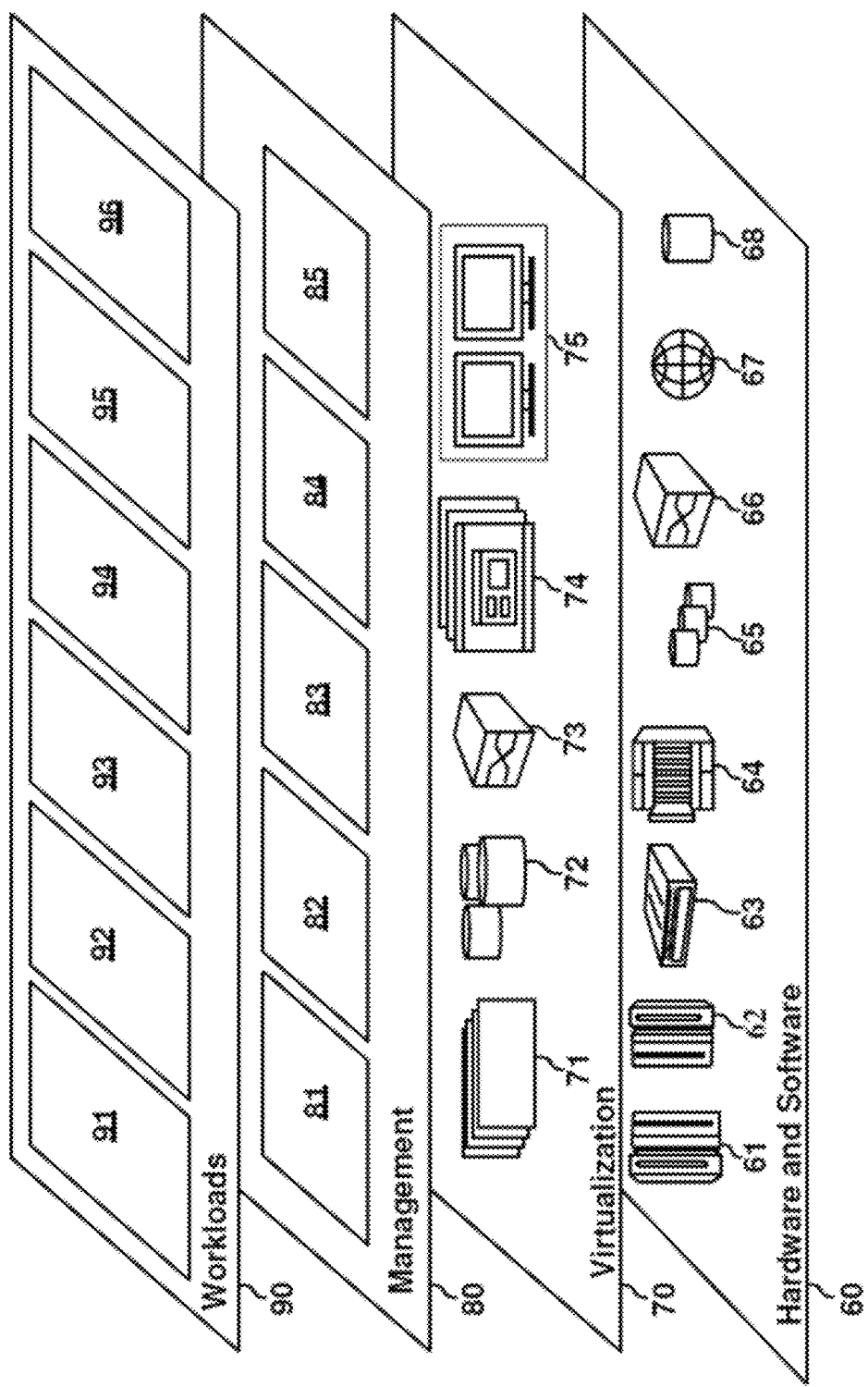
FIG. 7 depicts abstraction model layers according to an embodiment of the present invention.

FIGS. 5-7 depict various aspects of computing, including a cloud computing system, in accordance with one or more aspects set forth herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 5, a schematic of an example of a computer system/cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 5, computer system 12 in cloud computing node 10 is shown in the form of a general-purpose computing device. The components of computer system 12 may include, but are not limited to, one or more processors 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile memory device (e.g., a "thumb drive", "external hard drive"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. Each of the operating system, one or more application programs, other program processes, and program data or some combination thereof, may include an implementation of the stylization engine 130 and the stylized NLG system 120 of FIG. 1, respectively. Program processes 42, as in the stylization engine 130 of the stylized NLG system 120 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processors, external disk drive arrays, RAID systems, tape drives, and data archival storage systems, etc.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components for the stylized natural language generation (NLG) services as provided by the stylized NLG system 96, as described herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A computer implemented method for automatically generating a publication in a style of an author, comprising:
   obtaining, by one or more processor, a style feed including a plurality of original works by the author;
   building, by the one or more processor, an author-style model for the author based on the style feed, by use of a selected neural network;
   devising, by the one or more processor, a natural language generation scheme for the publication based on a publication request specifying parameters including a topic and genre of the publication, a target content of the publication, a target audience of the publication, an expected time for the publication, and a channel by which the publication is to be communicated; and
   automatically generating, by use of natural language generation according to the natural language generation scheme from the devising, the publication of the target content in the style of the author based on the author-style model from the building, wherein the publication is one of a series of publications to be generated and published to the target audience via the channel based on a preconfigured timeframe.

2. The computer implemented method of claim 1, further comprising:
   obtaining, prior to the devising of the natural language generation scheme, by the one or more processor, a content feed including various types of material classified by a genre and a subject of each material; and
   building, prior to the devising of the natural language generation scheme, by the one or more processor, a genre model and a subject model based on the material from the content feed, by use of the selected neural network, wherein the genre model and the subject model corresponding to the target content of the publication are respective components of the natural language generation scheme additional to the author-style model, and wherein the author modeled in the author-style model includes one or more individual writers for the author-style model to achieve a consistent style in a series of publications including the publication for a group of authors.

3. The computer implemented method of claim 1, further comprising:
   obtaining, by the one or more processor, an audience feed including demographic information of an audience providing the audience feed and respective responses to various publications;
   building, by use of the selected neural network, an audience model based on the audience feed, identifying a certain style most effective for each group amongst the audience including the target audience; and
   adjusting, by use of natural language generation, the publication based on the audience model and based on the target audience of the publication, to a style most effective for the target audience of the publication according to the audience model corresponding to the target audience.

4. The computer implemented method of claim 3, further comprising:

generating, by use of natural language generation, a differentiated publication based on an alternative channel through which the differentiated publication would be communicated to the target audience, pursuant to determining that one or more channel including a channel preferred by the target audience includes the alternative channel, wherein the one or more channel corresponding to a type of the publication includes a live presentation, a web article, a social media posting, elements of online news including headlines, interviews, op-eds, press releases, and reports.

5. The computer implemented method of claim 1, wherein the author-style model for the author includes elements of: a proficiency level of and/or idiosyncratic usages on mechanics of a target language, including but not limited to, spelling, grammar, and punctuation; a typical diction of the author; signature word sequences, sentence structures and lengths habitually used by the author, paragraph structures frequently used by the author, an average paragraph length in the number of sentences by the author; a social dialect corresponding to socio-economic class, age, and/or other demographic features of the author; a linguistic register indicating vocabulary richness and formality scale; fluency/frequent usage in specialized nomenclature of particular topics, areas of industry, and/or academic subjects; and combinations thereof.

6. The computer implemented method of claim 1, further comprising:
   receiving a feedback from the target audience on the publication;
   updating a content feed with the generated publication; and
   updating an audience feed with the received feedback.

7. The computer implemented method of claim 1, further comprising:
   receiving a feedback from the author, where the feedback includes a request for updating the publication; and
   updating the publication as specified in the request by the author.

8. A computer implemented method comprising:
   building, by the one or more processor, an author-style model for an author based on a style feed, by machine learning on a selected neural network trained with the style feed including a plurality of original works by the author;
   building, by the one or more processor, concurrently with the building of the author-style model, a genre model and a subject model based on a content feed, by machine learning on the selected neural network trained with the content feed including various types of material classified by a genre and a subject of each material;
   building, by the one or more processor, concurrently with the building of the author-style model, an audience model based on an audience feed, by machine learning on the selected neural network trained with the audience feed including demographic information of an audience providing the audience feed and respective responses to various publications, the audience model identifying a certain style most effective for each demographic group amongst the audience;
   devising, by the one or more processor, a natural language generation scheme for a publication based on a publication request specifying a topic and genre of the publication, a target content of the publication, a target audience of the publication, a purpose of the publication, a channel by which the publication is to be communicated, a desired length of the publication, an expected time of delivering the publication via the channel, and a preferred author-style for the publication; and automatically generating, by use of natural language generation tools based on the natural language generation scheme from the devising, the publication of the target content in the style of the author based on the author-style model, according to parameters configured in the publication request.

9. The computer implemented method of claim 8, further comprising:
automatically generating, prior to the devising of the natural language generation scheme, based on preconfigured triggering conditions including a search spike for a specific topic, a public figure, or an event, a periodic setting for period publications on any topic, public figures, or events.

10. The computer implemented method of claim 8, further comprising:
ascertaining that the selected neural network is sufficiently trained for generating the publication by assessing a confidence score of a test publication generated by the selected neural network and by discovering that the confidence score of the test publication is greater than a preconfigured threshold for the confidence score of the publication, wherein the preconfigured threshold for the confidence score indicates that a style represented in the test publication would be acceptable by the target audience.

11. The computer implemented method of claim 8, further comprising:
ascertaining that the selected neural network is sufficiently trained for generating the publication by learning a predetermined number for respective training data samples for the author-style model, the genre model, the subject model, or the audience model, wherein the predetermined number of the training data samples is in a range large enough for the selected neural network to learn patterns in a corresponding model.

12. The computer implemented method of claim 8, further comprising:
ascertaining that the selected neural network is sufficiently trained for generating the publication by applying respective criteria per model in an order of respective priorities preconfigured for the author-style model, the genre model, the subject model, and the audience model, wherein the respective criteria is selected from the group consisting of: comparing a confidence score of a test publication to a preconfigured confidence score threshold; and respectively predetermined number of training data samples per the author-style model, the genre model, the subject model, and the audience model.

13. A computer program product comprising:
a computer readable storage medium readable by one or more processor and storing instructions for execution by the one or more processor for performing a method for automatically generating a publication in a style of an author, comprising:
obtaining a style feed including a plurality of original works by the author;
building an author-style model for the author based on the style feed, by use of a selected neural network;
devising a natural language generation scheme for the publication based on a publication request specifying parameters including a topic and genre of the publication, a target content of the publication, a target audience of the publication, an expected time for the publication, and a channel by which the publication is to be communicated; and automatically generating, by use of natural language generation according to the natural language generation scheme from the devising, the publication of the target content in the style of the author based on the author-style model from the building, wherein the publication is one of a series of publications to be generated and published to the target audience via the channel based on a preconfigured timeframe.

14. The computer program product of claim 13, further comprising:
obtaining, prior to the devising of the natural language generation scheme a content feed including various types of material classified by a genre and a subject of each material; and
building, prior to the devising of the natural language generation scheme a genre model and a subject model based on the material from the content feed, by use of the selected neural network, wherein the genre model and the subject model corresponding to the target content of the publication are respective components of the natural language generation scheme additional to the author-style model, and wherein the author modeled in the author-style model includes one or more individual writers for the author-style model to achieve a consistent style in a series of publications including the publication for a group of authors.

15. The computer program product of claim 13, further comprising:
obtaining an audience feed including demographic information of an audience providing the audience feed and respective responses to various publications;
building, by use of the selected neural network, an audience model based on the audience feed, identifying a certain style most effective for each group amongst the audience including the target audience; and
adjusting, by use of natural language generation, the publication based on the audience model and based on the target audience of the publication, to a style most effective for the target audience of the publication according to the audience model corresponding to the target audience.

16. The computer program product of claim 15, further comprising:
generating, by use of natural language generation, a differentiated publication based on an alternative channel through which the differentiated publication would be communicated to the target audience, pursuant to determining that one or more channel including a channel preferred by the target audience includes the alternative channel, wherein the one or more channel corresponding to a type of the publication includes a live presentation, a web article, a social media posting, elements of online news including headlines, interviews, op-eds, press releases, and reports.

17. The computer program product of claim 13, wherein the author-style model for the author includes elements of: a proficiency level of and/or idiosyncratic usages on mechanics of a target language, including but not limited to, spelling, grammar, and punctuation; a typical diction of the author; signature word sequences, sentence structures and lengths habitually used by the author, paragraph structures frequently used by the author, an average paragraph length in the number of sentences by the author; a social dialect corresponding to socio-economic class, age, and/or other demographic features of the author; a linguistic register indicating vocabulary richness and formality scale; fluency/frequent usage in specialized nomenclature of particular topics, areas of industry, and/or academic subjects; and combinations thereof.

18. The computer program product of claim 13, further comprising:
  receiving a feedback from the target audience on the publication;
  updating a content feed with the generated publication; and
  updating an audience feed with the received feedback.

19. The computer program product of claim 13, further comprising:
  receiving a feedback from the author, where the feedback includes a request for updating the publication; and
  updating the publication as specified in the request by the author.

* * * * *